(12) United States Patent
Cosby

(10) Patent No.: US 6,240,576 B1
(45) Date of Patent: Jun. 5, 2001

(54) PORTABLE TOILET

(76) Inventor: Leslie Cosby, 964 N. Hudson, Chicago, IL (US) 60610

( * ) Notice: Subject to any disclaimer, the term of this patent is extended or adjusted under 35 U.S.C. 154(b) by 0 days.

(21) Appl. No.: 09/067,976

(22) Filed: Apr. 29, 1998

(51) Int. Cl.[7] ............................. A47C 1/08; A47K 11/00
(52) U.S. Cl. .................. 4/483; 4/458; 4/476; 4/478; 297/188.09; 297/188.13; 297/250.1; 297/485
(58) Field of Search ............................. 4/449, 458, 114.1, 4/476, 478, 479, 483, 902; 247/188.08, 188.09, 188.13, 250.1, 485

(56) References Cited

U.S. PATENT DOCUMENTS

| | | | |
|---|---|---|---|
| 233,257 | * | 10/1880 | Klett .......................................... 4/476 |
| 541,219 | * | 6/1895 | Weston ....................................... 4/476 |
| 1,440,132 | * | 12/1922 | Chrisman .................................. 4/479 |
| 2,662,229 | * | 12/1953 | Wenkstern ................................ 4/476 |
| 5,286,085 | * | 2/1994 | Minami ............................... 297/250.1 |
| 5,359,737 | * | 11/1994 | Hodge ....................................... 4/476 |
| 5,485,637 | * | 1/1996 | Green ......................................... 4/483 |
| 5,720,513 | * | 2/1998 | Raukauskas ............................. 4/483 |
| 5,779,306 | * | 7/1998 | Ohlsson ........................... 297/256.16 |
| 5,806,924 | * | 9/1998 | Gonas .............................. 297/216.11 |

FOREIGN PATENT DOCUMENTS

| | | | |
|---|---|---|---|
| 3534745 | * | 1/1987 | (DE) ......................................... 4/449 |
| 2415447 | * | 9/1979 | (FR) ......................................... 4/449 |

* cited by examiner

Primary Examiner—Charles R. Eloshway
(74) Attorney, Agent, or Firm—Wood, Phillips, VanSanten, Clark & Mortimer

(57) ABSTRACT

A portable toilet having a frame defining a collection space for waste product, an opening in the frame, and a seating surface for supporting a user in a seated position to allow waste product from a user in the seated position to be discharged through the opening into the collection space. A removable cover is provided on the frame for selectively blocking and exposing the frame opening.

7 Claims, 3 Drawing Sheets

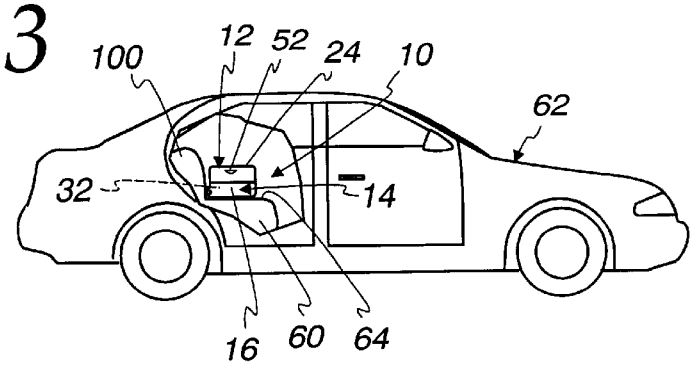
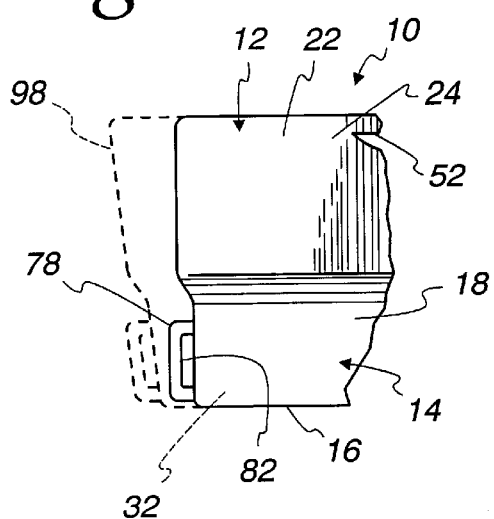
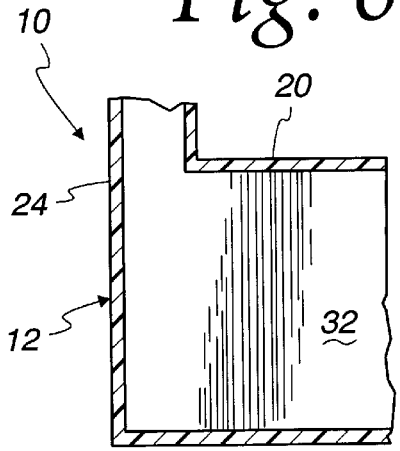
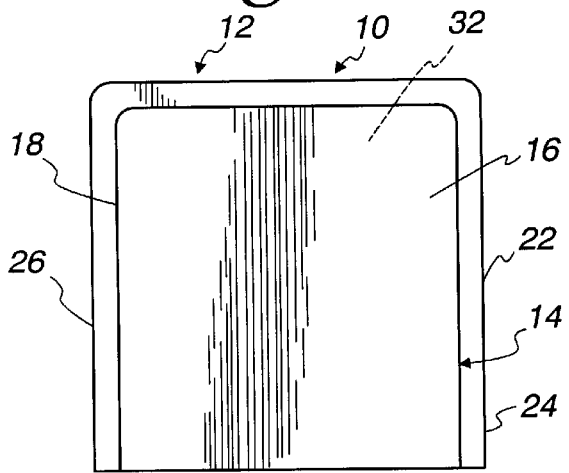
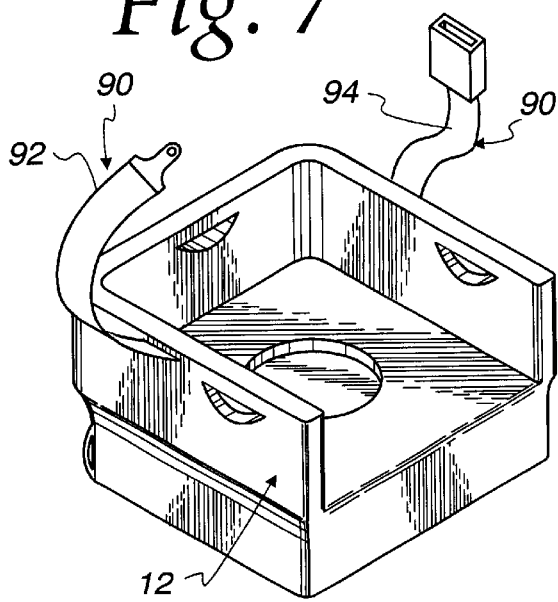

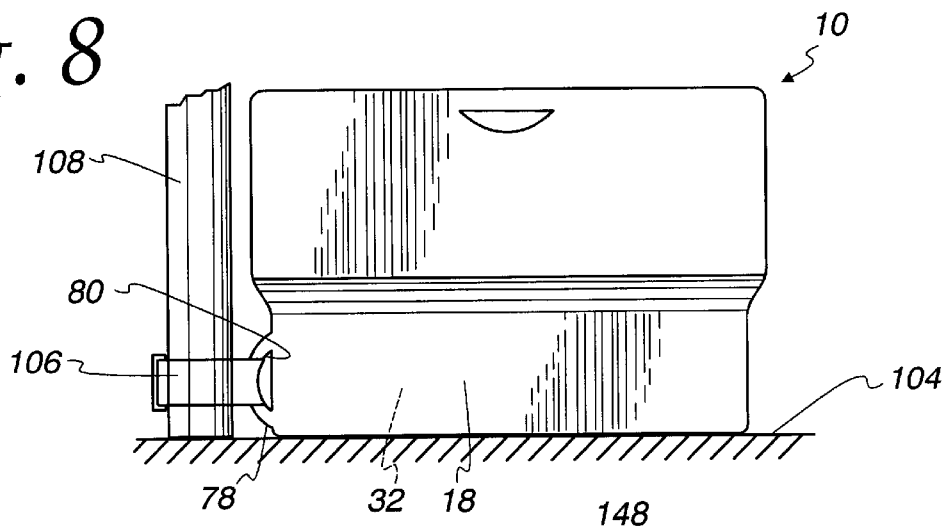
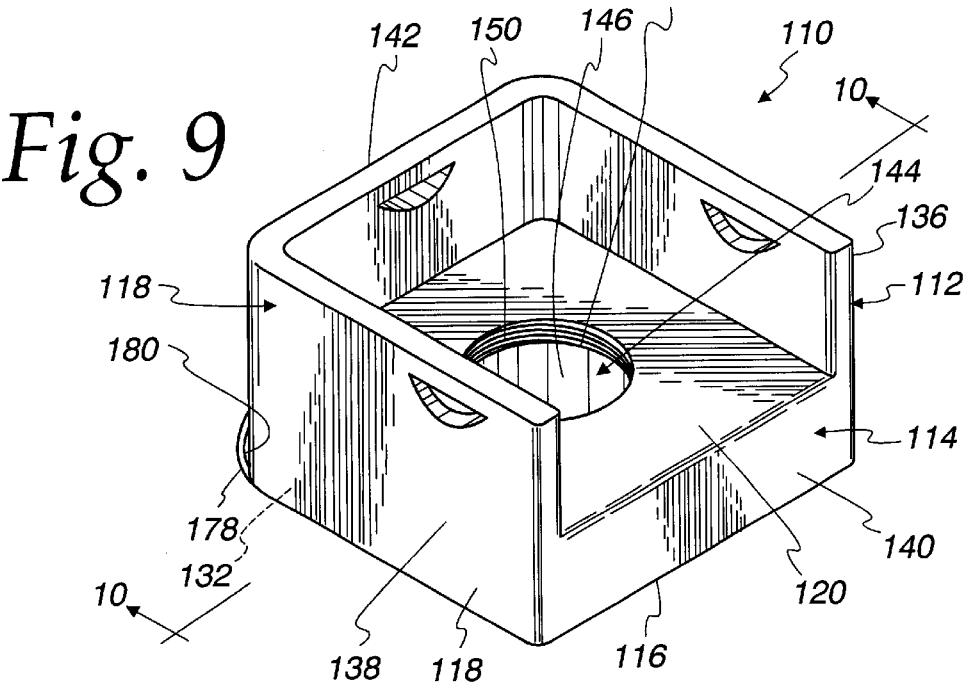
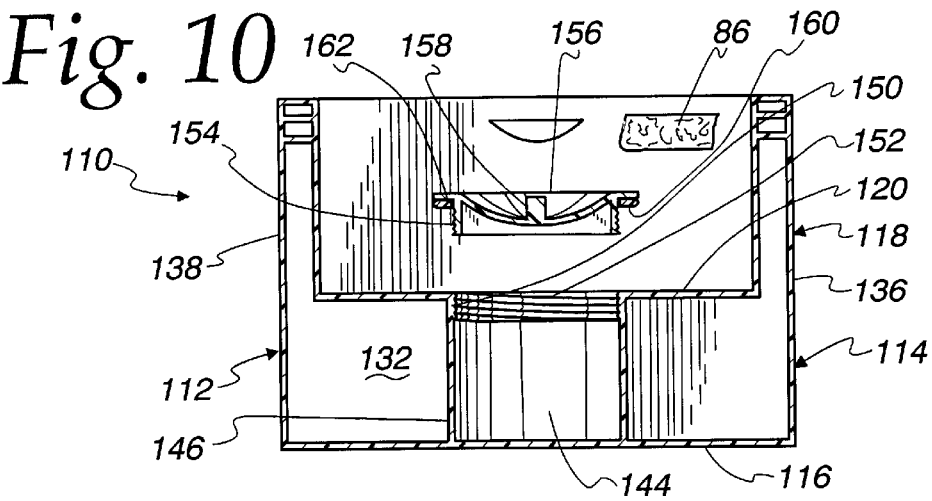

PORTABLE TOILET

BACKGROUND OF THE INVENTION

1. Field of the Invention

This invention relates to toilets and, more particularly, to a self-contained toilet that can be transported to, and used at, different locations.

2. Background Art

Many portable toilets have been designed for use by children. These toilets are typically designed to be used while supported on a stable surface, such as a floor.

It is common to empty the contents of this type of toilet immediately after use to avoid spilling of the contents thereof and to avoid the development of odors in the vicinity of the toilet.

To the knowledge of the inventor herein, no portable toilet design exists that is useable safely and effectively by a child as in a car. As a result, vehicle travel is normally interrupted to take children to an appropriate location to either use a permanent toilet or safely set up a portable toilet for use. Unfortunately, young children are often incapable of giving sufficient warning of the need to use a toilet to allow a permanent toilet facility to be accessed or the setting up of a portable toilet at a suitable location outside of the vehicle. The consequence of this is that vehicle seats may become soiled.

SUMMARY OF THE INVENTION

In one form, the invention is directed to a portable toilet having a frame defining a collection space for waste product, an opening in the frame, and a seating surface for supporting a user in a seated position to allow waste product from a user in the seated position to be discharged through the opening into the collection space. A removable cover is provided on the frame for selectively blocking and exposing the frame opening.

The frame may be made from molded plastic.

In one form, the frame has a front and rear and laterally spaced sides and a wall projecting upwardly from the seating surface at the rear and each of the spaced sides of the frame to confine a user in the seated position on the frame.

The frame may have a receptacle for a strap that can be used to maintain the portable toilet seat in the operative position on a passenger seat of a movable vehicle.

The movable vehicle has a seat strap with joinable strap parts that can be extended around an occupant of the passenger seat and joined to confine an occupant to the passenger seat. The seat strap is extendable through the receptacle with the strap parts joined.

An opening may be provided in the wall projecting upwardly from the seating surface to accept fingers on the hand of a user to facilitate lifting of the portable toilet by a user. The opening may extend fully through the wall projecting upwardly from the seating surface.

In one form, there is a gasket located between the cover and frame whereby the frame opening is substantially sealed by the cover and gasket.

A liner may be used to define a container for waste product. The liner can be removably connected to the frame to reside at least partially within the collection space to accumulate waste product directed into the collection space.

A cushion may be provided that is selectively placeable in a) a first position wherein the cushion bears against the seating surface, covers the frame opening, and is situated between the seating surface and the user in the seated position and b) a second position wherein the seating surface and frame opening are exposed to allow a user in the seated position to be supported directly against the seating surface.

In one form, the frame has a base portion defining a downwardly facing surface which supports the portable toilet and there is a single piece that defines the downwardly facing surface, the seating surface, and at least a part of the wall projecting upwardly from the seating surface.

In one form, the frame has one piece that defines the collection space and seating surface and with the cover on the frame, the cover and frame cooperatively define a closed collection space.

The invention is also directed to a portable toilet having a frame with a front and rear and laterally spaced sides and defining a collection space for waste product, a seating surface for supporting a user in a seated position to allow waste product from a user in the seated position to be discharged into the collection space, a receptacle for a strap that can be used to maintain the frame in an operative position at a point of use, and a wall projecting upwardly from the seating surface at the rear and each of the sides of the frame to confine a user in the seated position on the frame.

The invention is also directed to the combination of a movable vehicle having a passenger seat and a portable toilet which is removably maintained in an operative position on the passenger seat. The portable toilet has a frame defining a collection space for waste product and a seating surface for supporting a user in a seated position to allow waste product from a user in the seated position to be discharged into the collection space with the portable toilet in the operative position on the passenger seat.

The invention is also directed to a method of using a portable toilet having a frame defining a collection space for waste product, a seating surface for supporting a user in a seated position to allow waste product from a user in the seated position to be discharged into the collection space, and a receptacle for a strap. The method includes the steps of situating the portable toilet in an operative position on a passenger seat within a movable vehicle having joinable seat strap parts, directing one of the seat strap parts through the receptacle, joining the one seat strap part to the other seat strap part, and placing a user in a seated position on the seating surface so as to allow waste product from the user in the seated position to be discharged into the collection space.

BRIEF DESCRIPTION OF THE DRAWINGS

FIG. 3 is a reduced, side elevation view of the portable toilet of FIG. 1 in an operative position on a passenger seat in a movable vehicle;

FIG. 4 is a fragmentary, side elevation view of the portable toilet of FIG. 1 and showing a modification to a rear wall thereof in phantom lines;

FIG. 5 is a bottom view of the portable toilet in FIG. 1;

FIG. 6 is an enlarged, fragmentary, cross-sectional view of the portable toilet taken along line 6—6 of FIG. 1;

FIG. 7 is a perspective view of the portable toilet in FIG. 1 and including a restraining strap for the user thereof;

FIG. 8 is a side elevation view of the portable toilet of FIG. 1 in an operative position at a point of use and maintained in the operative position by a strap;

FIG. 9 is a perspective view of a modified form of portable toilet, according to the present invention; and FIG. 10 is an exploded, cross-sectional view of the portable toilet taken along line 10—10 of FIG. 9.

DETAILED DESCRIPTION OF THE DRAWINGS

Figure 1:
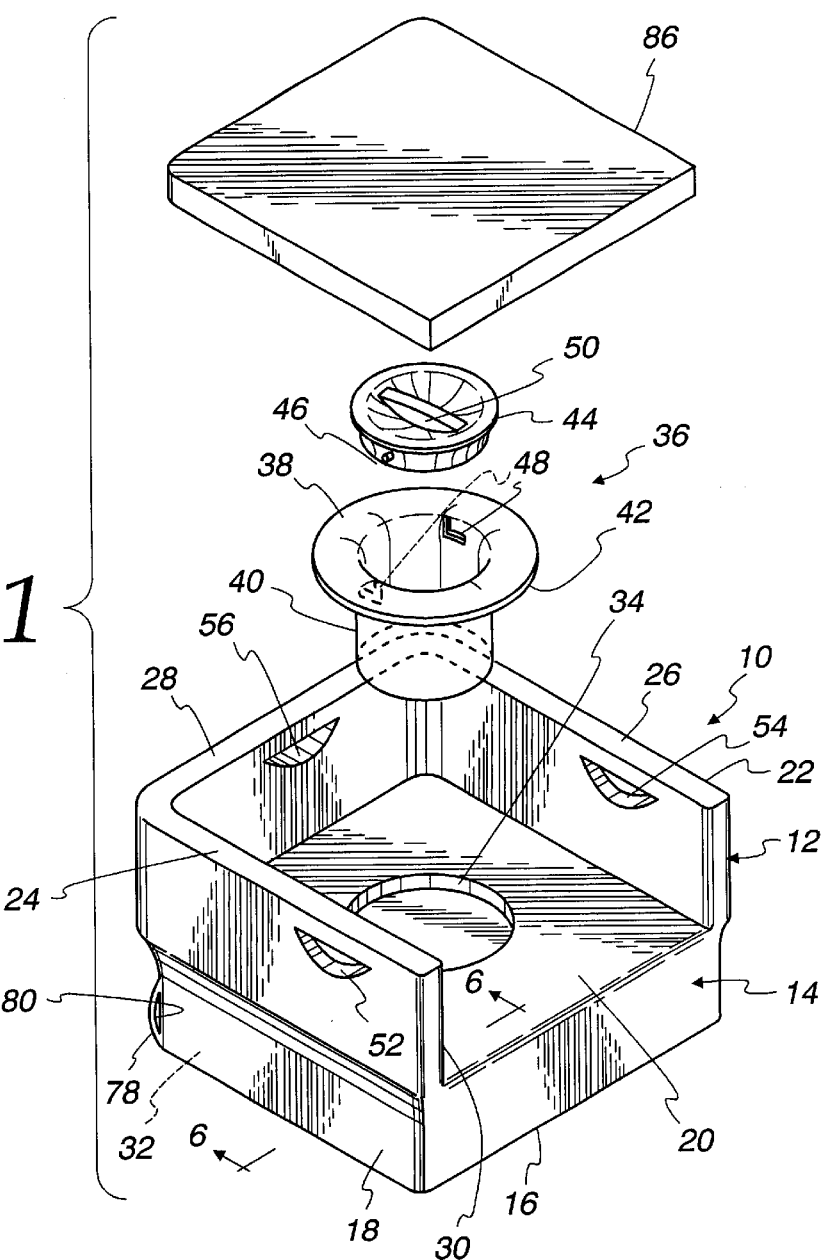
FIG. 1 is an exploded perspective view of a portable toilet, according to the present invention.

In FIGS. 1–6, one form of portable toilet, according to the present invention, is shown at 10. The portable toilet 10 has a frame 12. The frame 12 consists of a squared base portion 14 which defines a downwardly facing, flat surface 16 and a continuous, peripheral wall 18 extending upwardly from the surface 16 and terminating in an upwardly facing seating surface 20.

A restraining wall 22 projects upwardly from the seating surface 20 and consists of laterally spaced side wall portions 24, 26 and a rear wall portion 28, with the wall portions 24, 26, 28 extending continuously in a U shape, as viewed from overhead, so that there is an opening 30 through the wall 22 at the front of the toilet 10.

The base portion 14 is preferably hollow so as to define a collection space 32 for waste product. The waste product can be communicated through an opening 34 through the seating surface 20 to the collection space 32. The opening 34 is located so that with a user in a seated position on the seating surface 20, waste product can be discharged into the collection space 32 through the opening 30.

A cartridge assembly 36 may be utilized to facilitate disposal of waste product introduced to the collection space 32. The cartridge assembly 36 consists of a ring-shaped flange 38 and a cylindrical, cup-shaped liner 40 that is either removably attached to the flange 38 or joined thereto so as to define a unitary structure therewith. The liner 40 is extendable through the opening 34 so that the underside 42 of the flange 38 bears upon the seating surface 20. By withdrawing the liner 40 from the collection space 32, the contents thereof can be conveniently discarded. It is also contemplated that the liner 40 could be disposable and replaceable so that, after a single use, the liner 40 can be separated from the flange 38, disposed of, and replaced with a new liner 40.

With the cartridge assembly 36 in place, a removable cover/cap 44 can be installed on the flange 38 to cover the opening 34. The cover/cap 44 has pins 46 (one shown) at diametrically opposite locations thereon to cooperate one each with a bayonet-type slot 48 in the flange 38. By pressing the cover/cap 44 downwardly into the slot 48, and effecting a partial turn of the cover/cap 44, the cover/cap 44 can be removably locked in place. A graspable rib 50 is provided to facilitate turning of the cover/cap 44.

Finger receiving openings 52, 54, 56 are provided through the side wall parts 24, 26 and rear wall part 28, to facilitate reorienting and transportation of the portable toilet 10.

Figure 2:
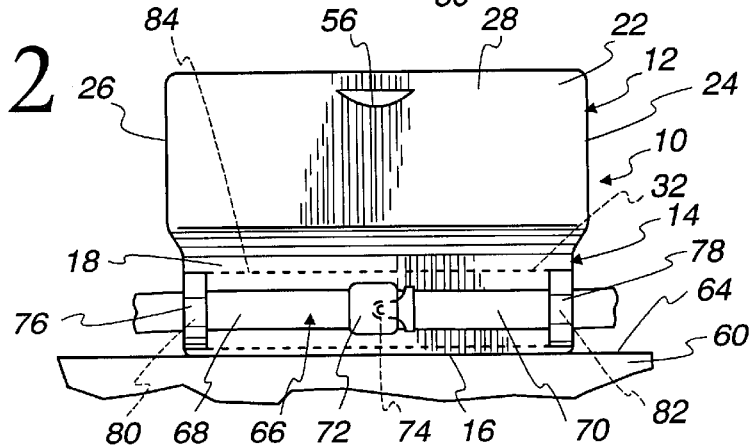
FIG. 2 is a rear elevation view of the portable toilet of FIG. 1 in an operative position on a supporting surface.

The portable toilet 10 is constructed so as to be placeable in an operative position, shown in FIGS. 2 and 3, on a passenger seat 60 on a movable vehicle 62, shown as a conventional automobile. In the operative position, the downwardly facing surface 16 bears on an upwardly facing surface 64. The toilet 10 can be maintained in the operative position by a conventional seat straps 66 used as a passenger restraint. In this case, the seat strap 66 consists of strap parts 68, 70 with the strap part 68 having a conventional female connector 72 and the strap part 70 having a conventional male connector 74 which is releasably held within the female connector 72.

To accommodate the seat strap 66, the frame 12 has laterally spaced bosses 76, 78, defining receptacles 80, 82 through which the seat strap 66 can be extended. The receptacles 80, 82 are dimensioned to allow passage therethrough of the connectors 72, 74. With the connectors 72, 74 joined, the strap 66 can be adjusted to exert a holding force upon the bosses 76, 78.

As an alternative to this construction, a continuous sleeve, shown in phantom lines at 84 in FIG. 2, can be used. This construction requires that one of the strap parts 68, 70 be extended fully through the sleeve 84 to be joinable with the other strap part 68, 70.

Through this arrangement, the portable toilet 10 can be placed in the operative position on the passenger seat 60 and strapped in place to be useable within the vehicle 62. After use, the cartridge assembly 36 can be removed to conveniently dispose of the contents thereof. The cap 44 can then be installed upon the flange 38 to cover the opening 34. Preferably, the cap 44, flange 38, and seating surface 20 are configured to allow a user to comfortably be seated thereupon, giving the portable toilet 10 the versatility of functioning as a toilet and also as a passenger seat. An optional cushion 86 can be placed over the seating surface 20, cap 44, and 20 flange 38 to make the portable toilet 10 more comfortable when used strictly as a seat.

A still further option, as shown in FIG. 7, is the incorporation of a seat strap 90 into the frame 12, which seat strap 90 consists of joinable strap parts 92, 94. With this arrangement the portable toilet 10 is confined in the operative position on the passenger seat 60 through the seat strap 66, with the user of the portable toilet 10 being in turn confined in a seated position on the portable toilet 10 by the seat strap 90.

In a preferred form, the frame 12 is formed as one piece of molded plastic. This facilitates both manufacturing and cleaning of the frame 12. By making the base portion 14 and at least part of the restraining wall 22 as one piece, the integrity of the frame 12 may be assured.

The invention also contemplates that the overall shape of the frame 12 can be changed from that shown. For example, as shown in dotted lines in FIG. 4, a rear wall 98 on the frame 12 may be inclined at an angle which is more compatible with the angle of the upright seat portion 100 (FIG. 3) on the passenger seat 60. This may add to the overall stability with the portable toilet 10 in the operative position.

It is also contemplated that the portable toilet 10 can be placed stably on any type of support surface, such as a floor, or the like, as shown at 104 in FIG. 1. As further shown in FIG. 8, a flexible strap 106 can be directed through the receptacles 80 and around a bar 108, or any other stable object, to maintain the portable toilet 10 stably in the operative position of FIG. 8.

In FIGS. 9 and 10, a modified form of portable toilet, according to the present invention, is shown at 110. The toilet 110 has a frame 112 with a base portion 114 defining a downwardly facing surface 116. The frame 112 has a peripheral wall 118 extending upwardly from the base portion 114. An upwardly facing seating surface 120 supports the user. The base portion 114 is hollow so as to define a collection space 132 for waste product.

The portable toilet 110 differs from the portable toilet 10 primarily in two respects. First, the base portion 114 and peripheral wall 118 cooperatively define a more squared configuration with flat side surfaces 136, 138 and flat front and rear surfaces 140, 142.

The other difference resides in the formation of a collection space chamber 144. The chamber 144 is bounded by a cylindrical wall 146 which extends fully between the downwardly facing surface 116 and the seating surface 120. An opening 148 through the seating surface 120 is located so that with the user in a seated position on the seating surface 120, waste product can be communicated through the opening 148 to the chamber 144.

An upper rim 150 of the wall 146 has threads 152 which mate with threads 154 on a removable cover/cap 156. The cover/cap 156 has a rib 158 to facilitate turning of the cover/cap to selectively assemble the cover/cap 156 to the frame 112 and remove the cover/cap 156 from the frame 112. By assembling the cover/cap 156, the chamber 144 can be fully closed.

An optional gasket 160 can be used to be captively held between a flange 162 on the cover/cap 156 and the seating surface 120 so as to leakproof the connection between the cover/cap 156 and frame 112.

The cushion 86 can optionally be used in the same manner with the portable toilet 110.

The frame 112 shown as a single molded piece that defines preferably the support surface 116, the seating surface 120, and the cylindrical wall 146. With this arrangement, the chamber 144 can readily be made to be leakproof. With the cover/cap 156 in place, the toilet 110 can be tipped and transported without spilling the contents thereof. At the same time, the cover/cap 156 confines odors to the chamber 144.

The toilet 110 can be maintained in place by providing bosses 178 having receptacles 180, of the type previously described.

The foregoing disclosure of specific embodiments is intended to be illustrative of the broad concepts comprehended by the invention.

What is claimed is:

1. A portable toilet comprising:

a frame defining a sealable collection space for waste product, an opening in the frame, and a seating surface for supporting a user in a seated position to allow waste product from a user in the seated position to be discarded through the opening into the collection space; and a removable cover on the frame for selectively sealing and exposing the frame opening, the removable cover being joinable to the frame through a threaded connection, the frame comprising a wall structure comprising a fixed configuration, integral piece that defines the collection space, a flat upwardly facing surface extending around the frame opening to support a user, a downwardly facing exposed surface to support the portable toilet on a subjacent surface, and a wall projecting upwardly from the seating surface at the rear and each of the spaced sides of the frame to confine a user in the seated position on the frame, said integral piece defining threads which cooperate with threads on the removable cover to make the threaded connection between the removable cover and frame.

2. The portable toilet according to claim 1 wherein there is an opening in the wall projecting upwardly from the seating surface to accept fingers on the hand of a user to facilitate lifting of the portable toilet by a user.

3. The portable toilet according to claim 2, wherein the opening in the wall projecting upwardly from the seating surface extends fully through the wall projecting upwardly from the seating surface.

4. The portable toilet according to claim 1 wherein there is a gasket that is located between the cover and frame, whereby the frame opening is substantially sealed by the cover and gasket.

5. The portable toilet according to claim 1 further comprising a cushion that is selectively placeable in a) a first position wherein the cushion bears against the seating surface, covers the removable cover and frame opening, and is situated between the seating surface and a user in the seated position and b) a second position wherein the seating surface and frame opening are exposed to allow a user in the seated position to be supported directly against the seating surface.

6. The portable toilet according to claim 1 wherein the integral piece comprises molded plastic.

7. The portable toilet according to claim 1 wherein the integral piece defines a receptacle for a strap that can be used to maintain the portable toilet in an operative position on a passenger seat of a movable vehicle.

* * * * *